(12) United States Patent
Thompson et al.

(10) Patent No.: US 7,429,003 B2
(45) Date of Patent: Sep. 30, 2008

(54) SPRAY BOOM SUSPENSION LOCK ASSEMBLY

(75) Inventors: Dennis G. Thompson, Saskatoon (CA); Dennis W. Chahley, Martensville (CA)

(73) Assignee: CNH Canada, Ltd. (CA)

( * ) Notice: Subject to any disclaimer, the term of this patent is extended or adjusted under 35 U.S.C. 154(b) by 803 days.

(21) Appl. No.: 11/097,000

(22) Filed: Apr. 1, 2005

(65) Prior Publication Data

US 2006/0219809 A1 Oct. 5, 2006

(51) Int. Cl.
*B05B 1/20* (2006.01)
*A01B 63/00* (2006.01)

(52) U.S. Cl. ............... 239/167; 239/159; 239/166; 239/168; 172/311; 172/456

(58) Field of Classification Search ............... 239/146, 239/159–170, 172; 172/311, 456, 457, 674, 172/776
See application file for complete search history.

(56) References Cited

U.S. PATENT DOCUMENTS

| | | | |
|---|---|---|---|
| 3,731,879 A | 5/1973 | Kijkhof | |
| 4,045,143 A | 8/1977 | Gomiero | |
| 4,598,830 A | * 7/1986 | Fletcher | 239/166 |
| 4,607,708 A | 8/1986 | Landphair et al. | |
| 5,154,240 A | * 10/1992 | Carrick | 172/311 |
| 5,630,547 A | 5/1997 | Klemenhagen et al. | |
| 5,887,390 A | 3/1999 | Schulz et al. | |
| 5,950,926 A | 9/1999 | Chahley et al. | |
| 6,012,648 A | 1/2000 | Morris | |
| 6,234,407 B1 | 5/2001 | Knight et al. | |
| 6,293,352 B1 | 9/2001 | Hundeby et al. | |
| 6,336,511 B1 | 1/2002 | Friggstad | |

* cited by examiner

*Primary Examiner*—Darren W Gorman
(74) *Attorney, Agent, or Firm*—Rebecca Henkel

(57) ABSTRACT

An assembly for locking a suspension arrangement operatively connected between a boom assembly and a carrying frame that are supported on a boom support implement or vehicle is provided. The implement or vehicle also includes a lift linkage operable to move the carrying frame and connected boom assembly between a lowered, operative position and a raised, inoperative position. The lock assembly includes a lock pin and a bracket assembly. The lock pin is mounted at the lift linkage. The bracket assembly includes a first bracket and a second bracket. The first bracket is mounted at the boom assembly and the second bracket is mounted at the carrying frame. In the raised, inoperative position of the boom assembly, the first and second brackets are configured to receive the lock pin in a locked position to restrain the boom assembly from swinging or rotating with respect to the lift linkage.

20 Claims, 4 Drawing Sheets

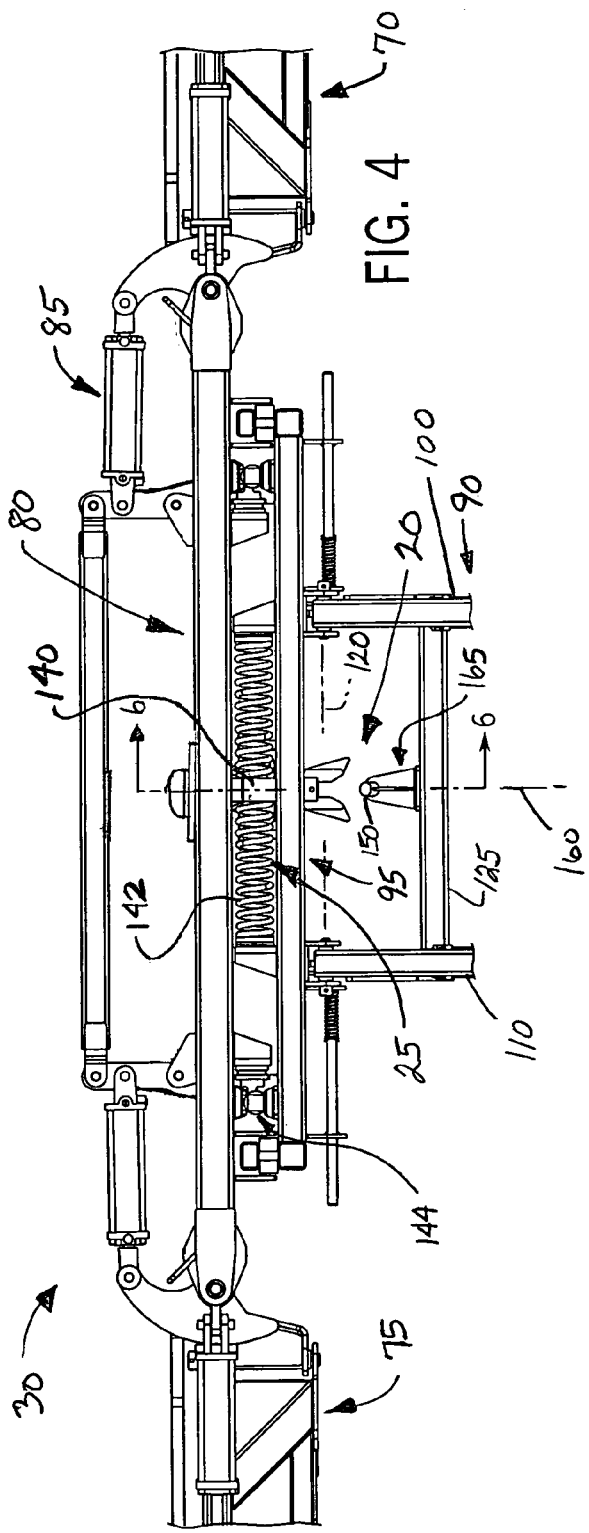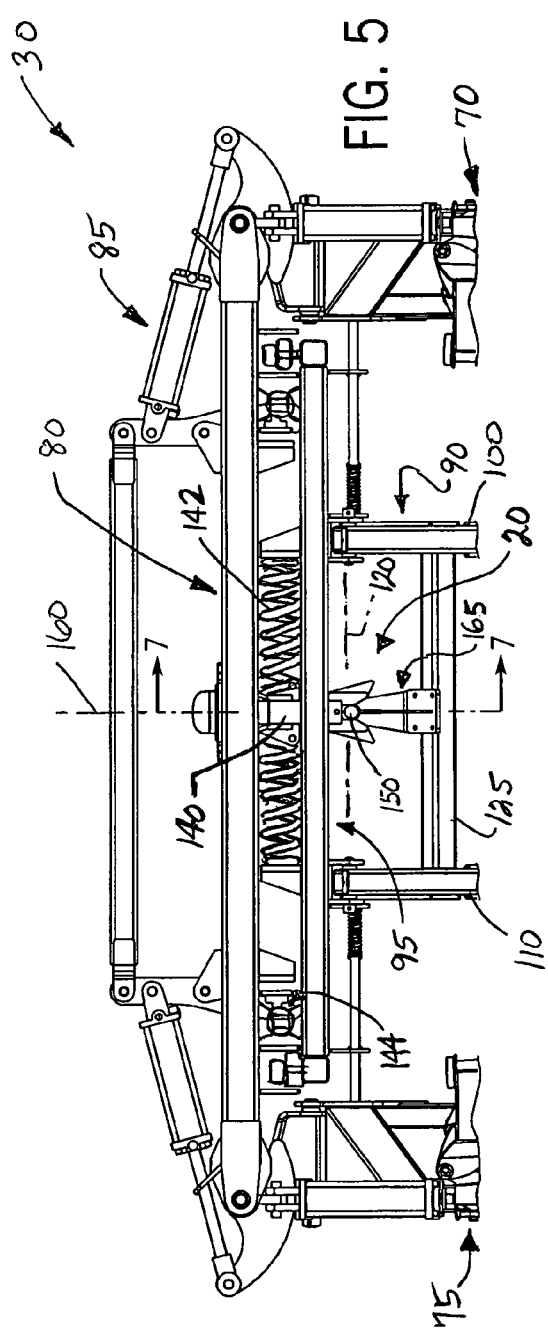

SPRAY BOOM SUSPENSION LOCK ASSEMBLY

FIELD OF THE INVENTION

The invention relates to a lock assembly for an agricultural sprayer, and more specifically, relates to a lock assembly operable to restrain a boom assembly from rotating about a roll-suspension arrangement with respect to a lift linkage.

BACKGROUND OF THE INVENTION

Boom assemblies are commonly used on agricultural vehicles or self-propelled implements, such as sprayers or planters, to dispense seed, fertilizer, insecticide, herbicide, etc. and other miscellaneous agricultural materials. The typical boom assembly includes a pair of booms configured to pivot or fold between operative and inoperative positions relative to the boom support vehicle. In the operative position, the booms commonly extend in a laterally outward direction from the boom support vehicle up to a distance of ninety-feet or larger such that the agricultural applicator covers a large surface area with each pass across a field. The weight of the boom assembly generally correlates with its operative length.

Upon completing distribution of the agricultural materials to the field, the booms are generally swung, pivoted or folded in a forward direction to a folded, inoperative position. The preferred folded, inoperative position of the booms are generally parallel to the direction of travel of the support vehicle such that the boom assembly and support vehicle have a narrow profile for transport from the field and on a roadway. Folding or swinging the booms is typically performed manually or by a hydraulic or pneumatic system mounted between the booms and the boom support vehicle. Before transport, the booms are generally seated in or on a boom cradle or saddle structure such that the boom assemblies are supported for travel on the roadway.

To accommodate the requirement for such elongated booms, manufacturers have developed a suspension arrangement for the boom assembly that is operable to reduce miscellaneous stresses imposed on the booms, the support framework, and/or the boom vehicles that are associated operation in the field. In addition, the suspension arrangement is designed to maintain a uniform distance or parallel altitude between the booms and the ground to maintain ideal spray coverage. A certain known "roll-suspension" arrangement includes a single pivot connection operatively connected between the boom assembly and the carrying or stationary frame in a manner that allows the boom to swing in a pendulum-like manner that is independent of the stationary frame. The addition of springs and/or shock-absorbers and/or dampers are beneficial in damping the movement of booms relative to the boom-support implement and/or vehicle when operating in rough terrain.

However, known suspension arrangements employed on boom support implements or vehicles have drawbacks. For example, when folding the boom assembly to a proper position to lock for transport, problems can occur. Even though the left and right booms of the boom assembly may be connected on the same hydraulic or pneumatic system, one boom may fold before the other and cause the boom assembly to become unbalanced and/or roll to one side. The boom assembly may also be unbalanced because the boom support vehicle or implement is parked on uneven ground. When the boom assembly is in an unbalanced position, the left and right booms may not fold to a proper position to be locked for transport.

Therefore, there is a need or desire for a lock assembly operable to secure a suspension arrangement of a boom assembly before pivoting the boom to a folded position for transport. The lock assembly should also be configured to be utilized with a wide variety of vehicles in addition to those related to agriculture.

SUMMARY OF THE INVENTION

The present invention provides an assembly for and a method of locking a suspension arrangement operatively connected between a boom assembly and a carrying frame supported on a boom support implement or vehicle that meets the desires and needs described above. The lock assembly of the present invention thus enhances the smooth transition of the boom assembly from an extended, operative position to a folded, inoperative position for transport.

In a first embodiment of the present invention, a lock assembly for a suspension arrangement operatively connected between the boom assembly and the carrying frame is provided. The suspension arrangement is operable to allow the boom assembly to swing independently of the carrying frame. The implement or vehicle also includes a lift linkage operable to move the carrying frame and connected boom assembly between a lowered, operative position and a raised, inoperative position. The carrying frame is pivotally coupled at the lift linkage. The lock assembly includes a lock pin mounted at the lift linkage; and a bracket assembly. The bracket assembly includes a first bracket and a second bracket, the first bracket mounted at the boom assembly and the second bracket mounted at the carrying frame. In the raised, inoperative position of the boom assembly, the first and second brackets are configured to receive the lock pin in a locked position to restrain the boom assembly from rotating with respect to the lift linkage.

In the lock position, the first bracket is positioned below the second bracket. The preferred first bracket includes a first slot and the second bracket includes a second slot each configured to receive the lock pin when the boom support is in the raised, inoperative position. The first and second slots are generally V-shaped to guide the lock pin to a seated position. The lock pin and the first and second brackets are preferably located generally along a central longitudinal axis of the carrying frame. The lock pin is mounted by an angle bracket to the lift linkage. The angle bracket includes a first leg connected at an angle relative to a second leg. The leg mounted at the lift linkage and the lock pin mounted at the second leg. The lock pin further includes a rib member transverse to the first and second legs and attached at a circumferential surface of the lock pin. In the locked position, the second leg of the angle bracket is positioned between the first and second brackets of the bracket assembly.

In another embodiment, the present invention provides an agricultural sprayer that includes a carrying frame in support of a boom assembly on a vehicle. The sprayer further includes a suspension arrangement operatively connected to allow the boom assembly to roll with respect to the carrying frame. The sprayer also includes a lift linkage pivotally connected to move the carrying frame and attached boom assembly between a lowered, operative position and a raised, inoperative position. The sprayer includes a lock assembly operable to restrain movement of the boom assembly and suspension arrangement with respect to the lift linkage and carrying frame. The lock assembly includes a lock pin mounted at the lift linkage, and a bracket assembly. The bracket assembly includes a first bracket and a second bracket. The first bracket is mounted at the boom assembly and the second bracket is mounted at the carrying frame. In the raised, inoperative position of the boom assembly, the first and second brackets are configured to receive the lock pin in a locked position to restrain the boom assembly from rotating with respect to the lift linkage.

In accordance with another aspect of the invention, a method of locking a suspension arrangement operatively connected between a boom assembly and a lift linkage mounted on a boom supported implement is provided, substantially in accordance with the foregoing summary.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 3 illustrates a detailed perspective view of the lock assembly of the present invention.

FIG. 4 illustrates a detailed top view of the carrying frame in support of the boom assembly in a lowered, operative position.

FIG. 5 illustrates a detailed top view of the carrying frame in support of the boom assembly in a raised, inoperative position.

DETAILED DESCRIPTION OF THE PREFERRED EMBODIMENTS

Figure 1:
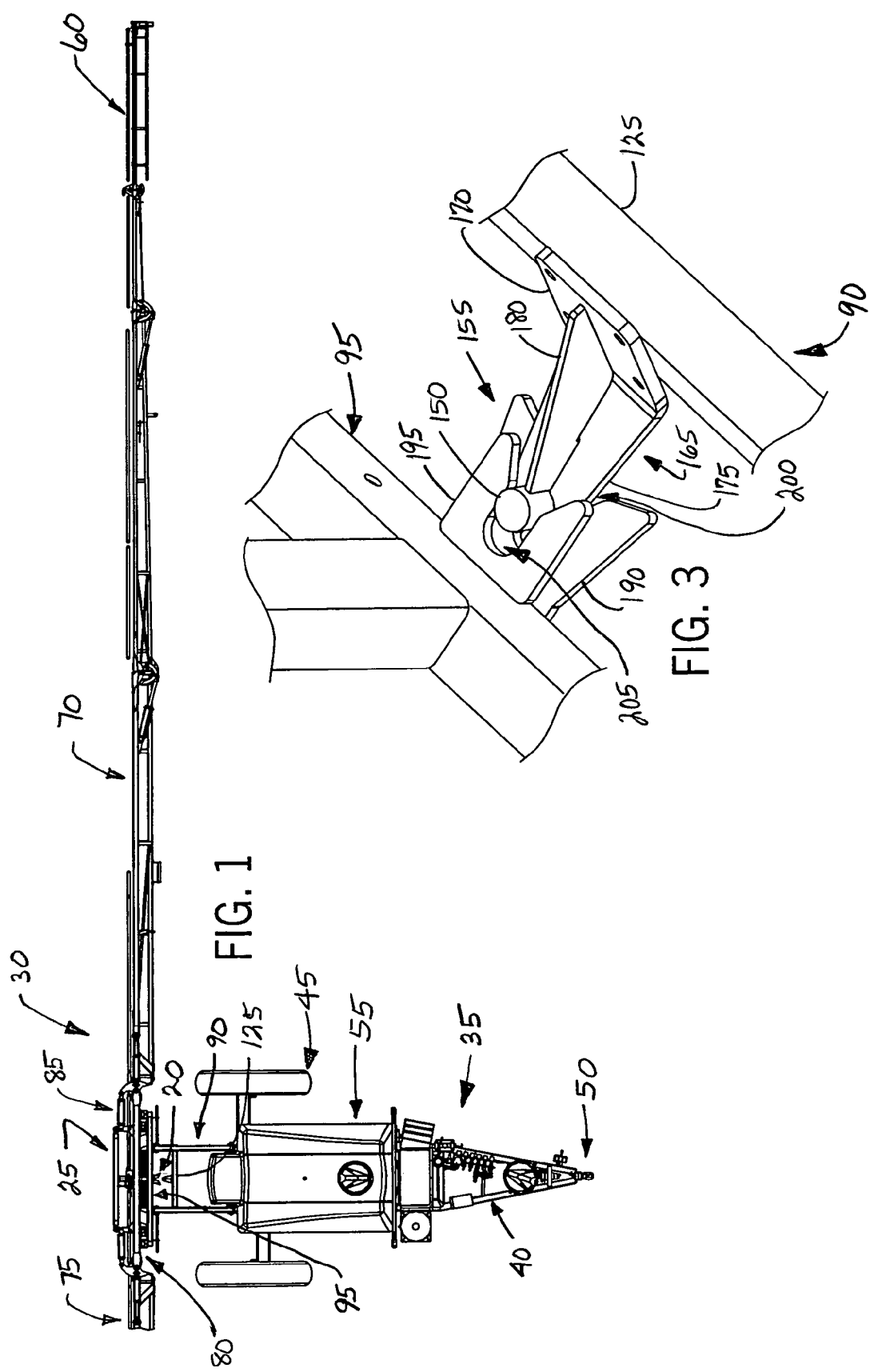
FIG. 1 illustrates a partial top plan view of a lock assembly of the present invention employed on an agricultural sprayer supporting a boom assembly, the boom assembly in an extended, operative position.
Figure 2:
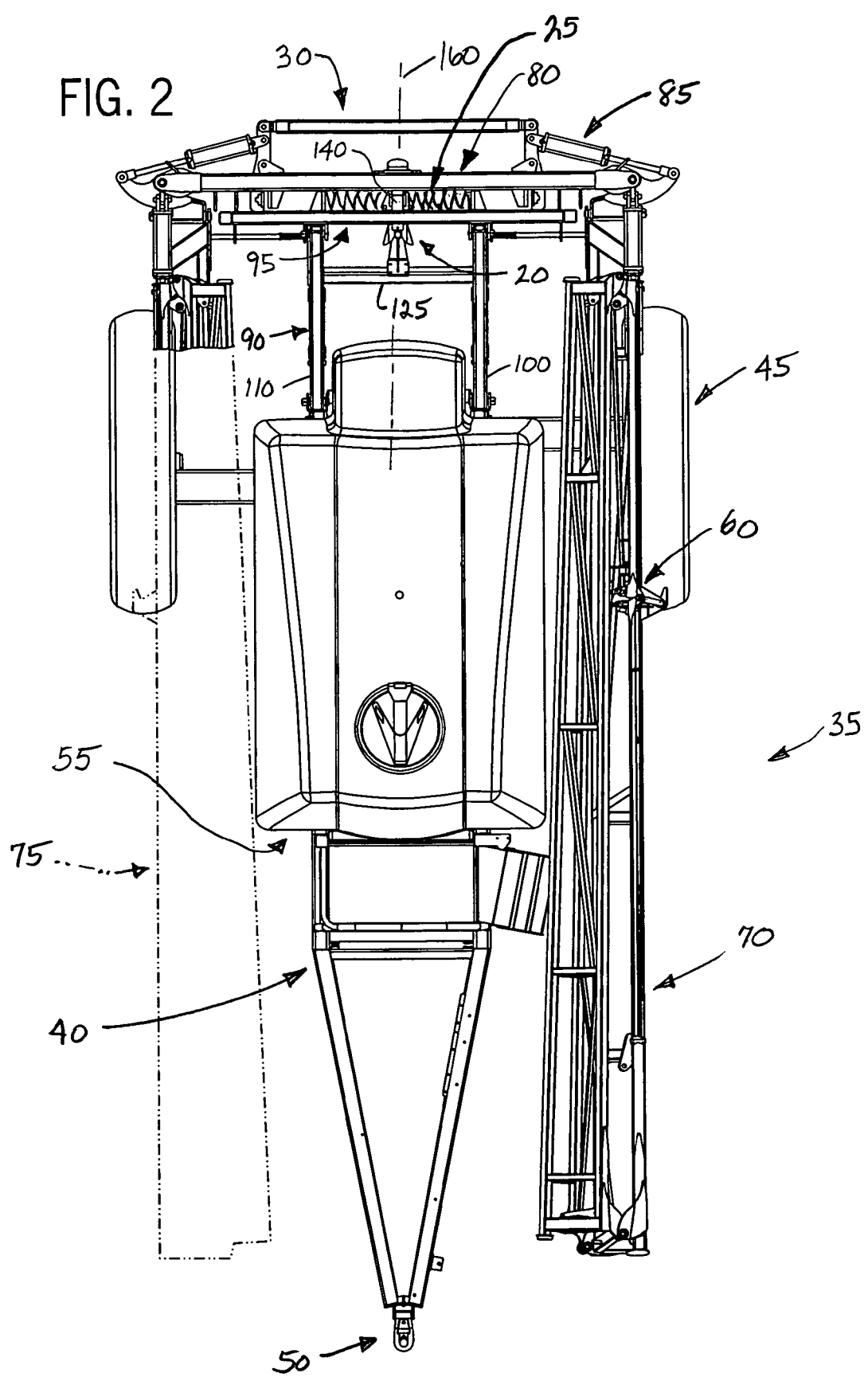
FIG. 2 illustrates a top plan of the lock assembly and agricultural sprayer shown in FIG. 1, the boom assembly in a folded, inoperative position.

FIGS. 1 and 2 show a lock assembly 20 operable to secure a "roll-suspension" arrangement 25 employed in combination with a boom assembly 30 on a boom support implement 35 in accordance with the present invention. The illustrated boom support implement 35 is a conventional agricultural sprayer implement of a type commonly used to apply crop pesticides, nutrients or animal/human waste (sludge) to soils, typically before and after planting in the spring and/or after harvest in the fall. The boom support implement 35 generally includes a mainframe structure 40 supported on plurality of oversized wheel assemblies 45 and a hitch 50 operable to be towed by a tow vehicle (not shown) across a field. The main frame 40 is generally configured in support of a reservoir or storage tank 55. With the booms assembly 30 in their extended, operative position (See FIG. 1), agricultural product is communicated in a known manner from the reservoir 55 to a series of spray nozzles 60 for distribution across a wide surface area of the field.

Still referring to FIGS. 1 and 2, the boom assembly 30 generally includes a left boom 70 and a right boom 75, each mounted by the series of nozzles 60 in fluid connection with the reservoir 55. The boom assembly 30 further includes a central frame structure 80 in pivotal support of the left and right booms 70 and 75. The left and right booms 70 and 75 each are pivotable by a conventional pivot actuator mechanism(s) 85 in a known manner so as to move the booms 70 and 75 between the extended, operative position (See FIG. 1) and the folded, inoperative position (See FIG. 2). The illustrated pivot actuator mechanism 85 is a hydraulic-driven mechanism. Yet it is understood that the type of actuator mechanism (e.g., hydraulic-driven, pneumatic-driven, manually driven, etc.) can vary.

Figure 7:
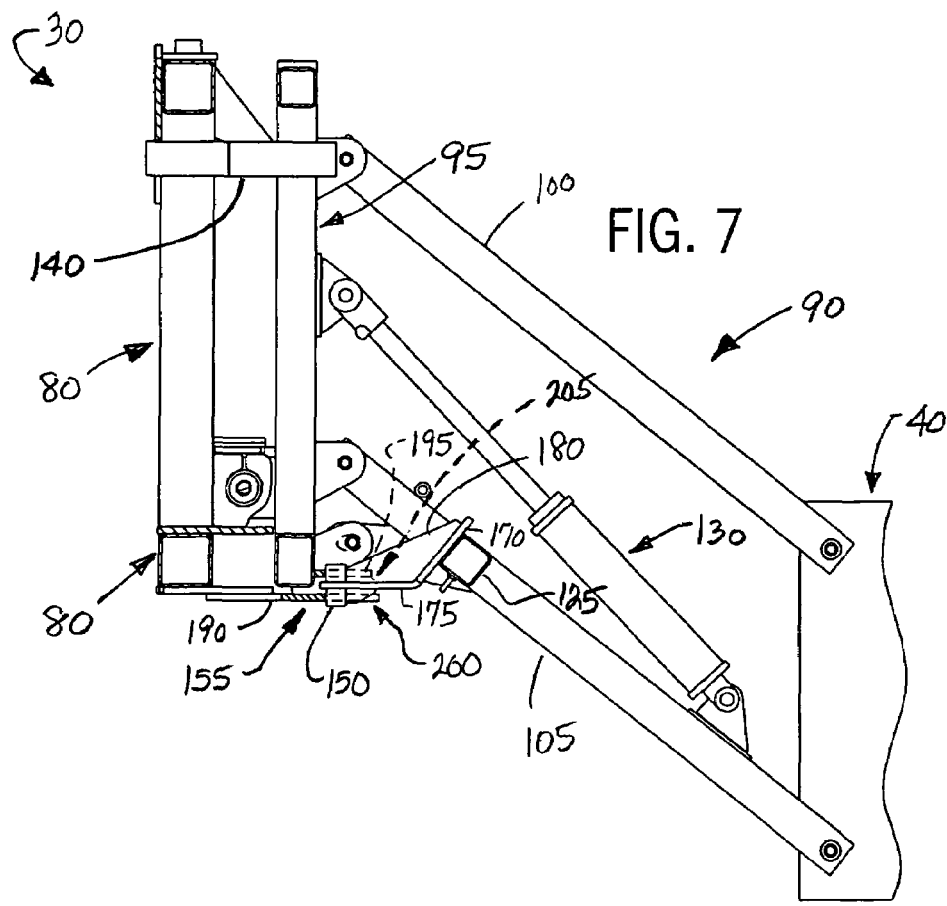
FIG. 7 illustrates a cross-section view along line 7-7 in FIG. 5.
Figure 6:
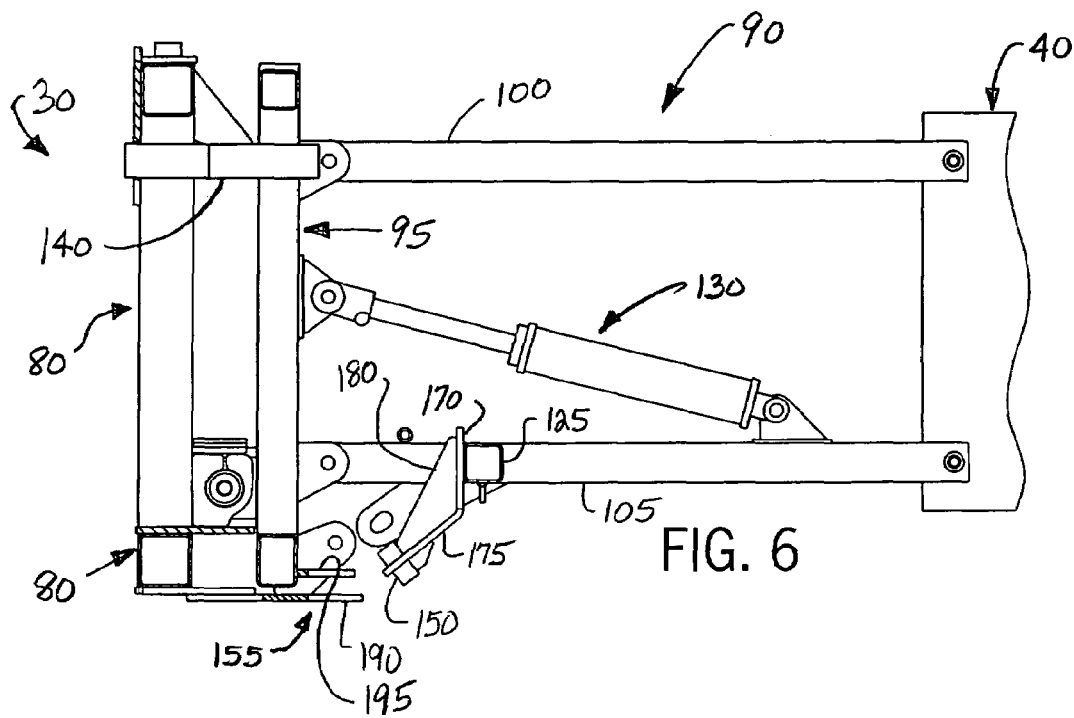
FIG. 6 illustrates a cross-section view along line 6-6 in FIG. 4.

Referring now to FIGS. 6 and 7, the central frame structure 80 of the boom assembly 30 is coupled to a lift linkage 90 by a carrying frame 95. The carrying frame 95 is generally a conventional stationary frame structure coupled in support of the boom assembly 30 at the lift linkage 90. The lift linkage 90 is generally operable to be move the carrying frame 95 and attached boom assembly 30 between a lowered, operative position (FIG. 6) and a raised, inoperative position (FIG. 7). The preferred lift linkage 90 is generally includes an upper left linkage member 100 and a lower left linkage member 105, and an upper right linkage member 110 (See FIG. 2) and lower right linkage member (not shown). One end of each of the upper and lower left linkage members 100 and 105 and the upper and lower right linkage members (lower right linkage not shown) is pivotally attached at the carrying frame 95 about a horizontal axis 120. The other end of the each of the upper and lower left linkage members 100 and 105 and the upper and lower right linkage members 110 (lower right linkage not shown) is pivotally attached at the support frame 40 about a horizontal pivot axis. The lift linkage 90 also includes a central linkage member 125 fixedly interconnected between the left and right lower linkage members 105 (right lower linkage not shown).

A conventional lift actuator mechanism(s) 130 (e.g., hydraulic cylinder, pneumatic cylinder, etc.) is configured to drive or cause the lift linkage 90 to move the carrying frame 95 and supported boom assembly 30 between the lowered, operative position (See FIG. 6) and the raised, inoperative position (See FIG. 7). Once the lift linkage 90 has moved the boom assembly 30 to the raised, inoperative position, the conventional pivot actuator 85 is operable to move the boom assembly 30 to the folded, inoperative position (See FIG. 2) for transport.

Referring now to FIGS. 4-7, the conventional "roll" suspension arrangement 25 operatively connects the carrying frame 95 and the boom assembly 30 in a known manner such that the boom assembly 30 is operable to roll or rotate independent of the carrying frame 95 and lift linkage 90. Thereby, the suspension arrangement 25 is generally operable in a known manner to maintain a uniform distance or parallel altitude between the booms 70 and 75 of the boom assembly 30 and the ground. Referring specifically to FIGS. 4 and 5, the illustrated suspension arrangement 25 includes a single pivotal connection 140 operatively connected between the central frame structure 80 of the boom assembly 30 and the carrying frame 95. The pivot connection 140 is configured to allow the boom assembly 30 to swing in a pendulum-type manner independently of the carrying frame 95. The suspension arrangement 25 further includes one or more springs 142 and/or shocks 144 or the like (e.g., dampers, etc.) that are located to isolate movement of the boom assembly 30 relative to the carrying frame 95 and the lift linkage 90 in a conventional manner.

Referring to FIGS. 3-7, the lock assembly 20 of the present invention is configured restrain the suspension arrangement 25 such that the boom assembly 30 does not roll or rotate with respect to the carrying frame 95 and the lift linkage 90. The preferred embodiment of the lock assembly 20 generally includes a lock pin 150 and a bracket assembly 155. The lock pin 150 and the bracket assembly 155 are preferably located generally along a central longitudinal axis 160 (See FIGS. 4 and 5) of the carrying frame 95 and in general alignment with the pivot connection 140 between the carrying frame 95 and the boom assembly 30.

The lock pin 150 is mounted at the central linkage member 125 of the lift linkage 90. The preferred lock pin 150 is mounted by an angle bracket 165 to the lift linkage 90. The angle bracket 165 includes a first leg 170 aligned at an angle relative to a second leg 175. The first leg 170 is mounted at the central linkage member 125 of the lift linkage 90 and the lock pin 150 is mounted at the second leg 175. The lock pin 150 further includes a rib member 180 aligned transverse to the first and second legs 170 and 175 and attached at a circumferential surface of the lock pin 150. The rib member 80 is configured to provide additional strength to the lock pin 150. Although the illustrated lock pin 150 is vertically aligned, alternatively the lock pin 150 can be horizontally aligned to slide into a respective horizontal bracket (not shown) to secure the suspension arrangement 25 in a similar manner.

Referring now to FIGS. 3 and 6-7, the bracket assembly 155 includes a first bracket 190 located below a second bracket 195. The first bracket 190 is mounted at the central frame structure 80 of the boom assembly 30. The second bracket 195 is mounted at the carrying frame 95. Referring specifically FIG. 3, the first bracket 190 includes a first slot 200 and a second bracket 195 includes a second slot 205.

Referring to FIG. 7, in the raised, inoperative position of the boom assembly 30, the first slot 200 of the first bracket 190 and the second slot 205 of the second bracket 195 are both configured to receive the lock pin 150 in a manner that restrains movement of boom assembly 30 with respect to the carrying frame 95 and lift linkage 90. The preferred first and second slots 200 and 205 are preferably V-shaped to guide the lock pin 150 to a seated, locked position therein. The second leg 175 of the angle bracket 175 is configured to be positioned between the first and second brackets of the bracket assembly 155 such that opposite ends of the lock pin 150 are engaged with the brackets 190 and 195.

In operation, assume for example that the lift linkage 90 holds the carrying frame 95 and attached booms 70 and 75 of the boom assembly 30 in a lowered, operative position (See FIGS. 1, 4 and 6) for spraying and distribution of product across the field. As the implement 35 is towed across the rough terrain associated with field operation, the suspension arrangement 25 is configured to maintain a uniform distance or parallel attitude between each of the booms 70 and 75 of the boom assembly 30 and the ground, and thereby enhances spray coverage of product across the field. The single pivotal connection 140 between the suspension arrangement 25 and the carrying frame 95 allows the boom assembly 30 to move independently of the carrying frame 95 and attached lift linkage 90. When finished with field operation, the operator activates the lift actuator mechanism 130 to cause the lift linkage 90 to move the carrying frame 95 and the attached boom assembly 30 to the raised, inoperative position (See FIG. 7).

As the lift linkage 90 raises the carrying frame 95 and the boom assembly 30 to the fully raised position, the first bracket 190 attached at the boom assembly 30 and the second bracket 195 attached at the carrying frame 95 move in a smooth transitional path to receive the lock pin 150 attached at the lift linkage 90. The V-shaped slots 200 and 205 in the first and second brackets 190 and 195, respectively, guide the locking pin 150 therein (See FIG. 3). The lift linkage 90 then partially lowers the carrying frame 95 and attached boom assembly 30 such that the lock pin 150 engages against the first and second brackets 190 and 195, respectively (See FIG. 7). Once the lock pin 150 is engaged against the brackets 190 and 195, the boom assembly 30 is balanced such that it is restrained from rolling or rotating with respect to the carrying frame 95 and lift linkage 90. The balanced boom assembly 30 enhances the ability of the pivot actuator mechanisms 85 to pivot the left and right booms 70 and 75 to the proper folded position (See FIGS. 2 and 5) for transport.

While the invention has been shown and described with respect to particular embodiments, it is understood that alternatives and modifications are possible and are contemplated as being within the scope of the present invention. For example, although the above described lock assembly is described with reference to an agricultural sprayer, one skilled in the art will recognize that the present invention is not so limited. A wide variety of boom support implements and vehicles could employ the lock assembly constructed in accordance with the invention. In addition, although a certain suspension arrangement is shown operatively connected between the carrying frame and the boom assembly, it should be understood that the lock assembly of the present invention can be employed to restrain a wide variety of suspension arrangements between a boom assembly and a boom support vehicle and is not limiting on the invention.

Many changes and modifications could be made to the invention without departing from the spirit thereof. The scope of these changes will become apparent from the appended claims.

We claim:

1. A lock assembly for a suspension arrangement operatively connected between a boom assembly and a carrying frame supported on a lift linkage, the suspension arrangement operable to allow the boom assembly to rotate independently of the carrying frame and the lift linkage, the lift linkage operable to move the carrying frame and the boom assembly between a lowered, operative position and a raised, inoperative position, the carrying frame pivotally coupled at the lift linkage, comprising:

a lock pin mounted at the lift linkage;
   a bracket assembly having a first bracket and a second bracket, the first bracket mounted at the boom assembly and the second bracket mounted at the carrying frame, wherein in the raised position of the boom assembly, the first and second brackets are configured to receive the lock pin in a locked position to restrain the boom assembly from rotating about the suspension arrangement with respect to the lift linkage.

2. The lock assembly as recited in claim 1, wherein the first bracket includes a first slot and the second bracket includes a second slot, the first and second slots configured to receive the lock pin when the boom assembly is in the raised position.

3. The lock assembly as recited in claim 2, wherein the first slot is generally V-shaped to guide the lock pin to be seated in the locked position.

4. The lock assembly as recited in claim 2, wherein the second slot is generally V-shaped to guide the lock pin to be seated in the locked position.

5. The lock assembly as recited in claim 2, wherein the first bracket is positioned below the second bracket.

6. The lock assembly as recited in claim 2, wherein the lock pin and the first and second brackets are located generally along a central longitudinal axis of the carrying frame.

7. The lock assembly as recited in claim 2, wherein the lock pin is mounted by an angle bracket at the lift linkage, the angle bracket having a first leg connected at an angle relative to a second leg, the first leg mounted at the lift linkage and the lock pin mounted at the second leg.

8. The lock assembly as recited in claim 7, wherein the lock pin is supported by a rib member generally aligned transverse to the first and second legs.

9. The lock assembly as recited in claim 7, wherein the second leg of the angle bracket is positioned between the first and second brackets of the bracket assembly in the locked position.

10. An agricultural sprayer, comprising:
a boom assembly that includes a central frame structure in pivotal support of a boom between an extended position and a folded position;
a carrying frame coupled by a suspension arrangement to the boom assembly;
a lift linkage operable to move the carrying frame and the boom assembly between a lowered, operative position and a raised, inoperative position; and
a suspension lock assembly, comprising:
a lock pin mounted at the lift linkage, and
a lock bracket assembly having a first bracket and a second bracket, the first bracket mounted at the central frame structure of the boom assembly and the second bracket mounted at the carrying frame,
wherein at an unlocked position of the suspension lock assembly, the boom assembly is operable to rotate via the suspension arrangement with respect to the carrying frame and lift linkage, and
wherein at the raised position of the carrying frame and the boom assembly, the first and second brackets receive the lock pin in a locked position in a manner so as to restrain the boom assembly from rotating about the suspension arrangement with respect to the lift linkage.

11. The agricultural sprayer as recited in claim 10, wherein the first bracket includes a first slot and is attached at the central frame structure of the boom assembly, and the second bracket includes a second slot and is attached at the carrying frame, the first and second slots configured to receive the lock pin in the locked position.

12. The agricultural sprayer as recited in claim 11, wherein the first bracket is generally V-shaped to guide the lock pin into the first slot.

13. The agricultural sprayer as recited in claim 11, wherein the second bracket is generally V-shaped to guide the lock pin into the second slot.

14. The agricultural sprayer as recited in claim 11, wherein as the lift linkage lowers the carrying frame from the raised position, the lock pin is released from the lock bracket assembly such that the boom assembly is free to rotate about the suspension arrangement with respect to the lift linkage.

15. The agricultural sprayer as recited in claim 11, wherein the lock pin is mounted along a central longitudinal axis of the lift linkage.

16. The agricultural sprayer as recited in claim 11, wherein the lock pin is mounted by an angle bracket to the lift linkage, the angle bracket having a first leg and a second leg, the first leg mounted at the lift linkage and the lock pin mounted at the second leg at an angle relative to the first leg.

17. The agricultural sprayer as recited in claim 16, wherein the lock pin is supported by a rib member aligned transverse to the first and second legs of the angle bracket.

18. The agricultural sprayer as recited in claim 16, wherein at the locked position of the lock pin in the lock bracket assembly, the second leg of the angle bracket is positioned between the first and second brackets of the lock bracket assembly.

19. A method of restraining a boom assembly from moving independently about a suspension arrangement with respect to a lift linkage, the method comprising the steps of:
providing a carrying frame in support of the boom assembly on the lift linkage,
holding the carrying frame and the boom assembly in a lowered, operative position;
raising the carrying frame and the boom assembly with the lift linkage to a raised, inoperative position; and
inserting a lock pin fixedly attached at the lift linkage in a first slot formed in a first bracket attached at the boom assembly and a second slot formed in a second bracket attached at the carrying frame,
wherein the lock pin restrains movement of the first and second brackets so that the boom assembly is restrained from rotating with respect to the lift linkage.

20. The method as recited in claim 19, the method further comprising the step of:
causing the lift linkage to lower the carrying frame and the boom assembly supported thereon until the lock pin is released from the first slot of the first bracket and the second slot of the second bracket so that the suspension arrangement is allowed to operate freely.

* * * * *